Feb. 21, 1933.    C. HOLLERITH    1,898,629
MEANS FOR POSITIONING FAN BLADES WITH ACCURATE BALANCE
Filed June 27, 1931
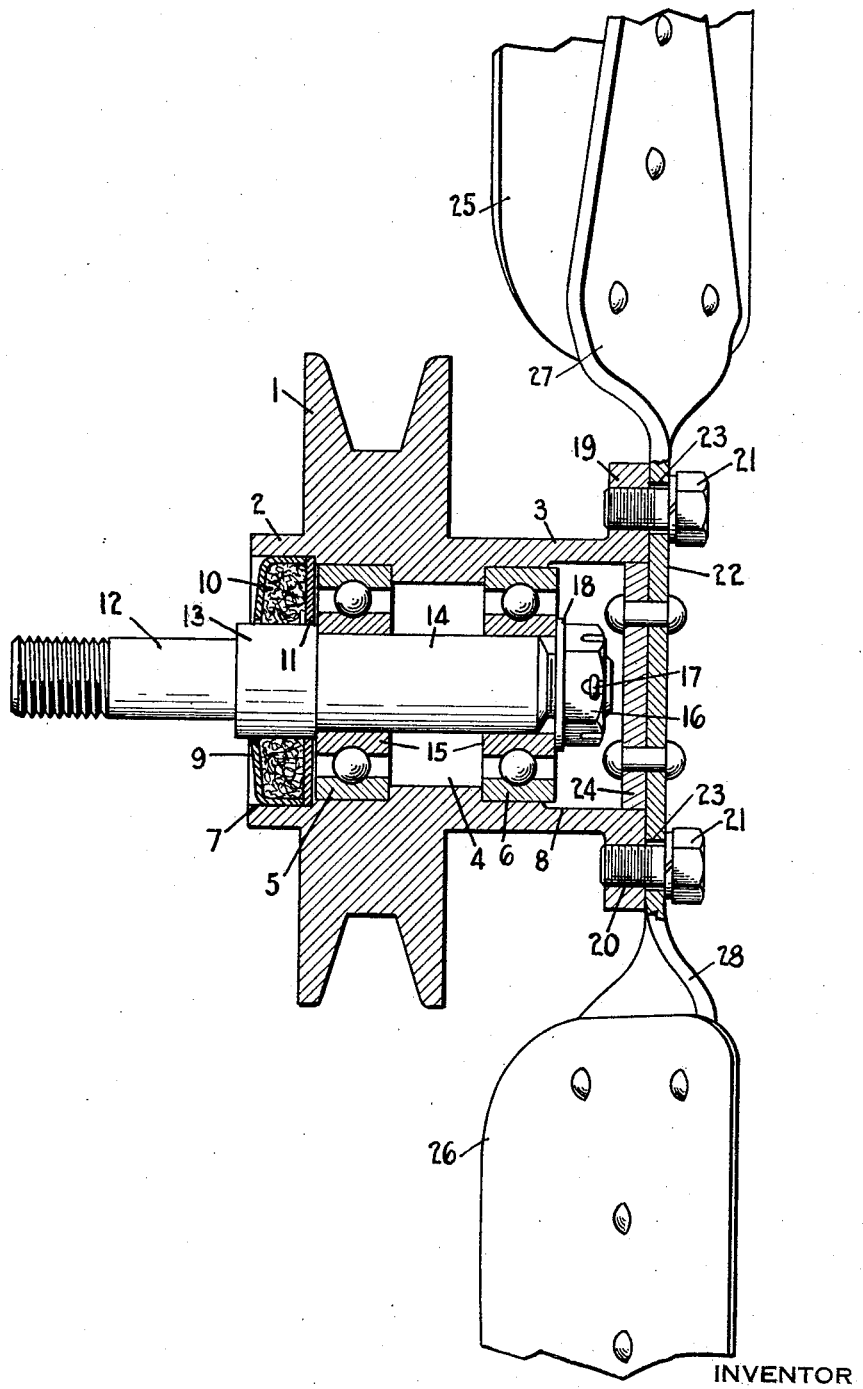
INVENTOR
Charles Hollerith
BY HIS ATTORNEY Patented Feb. 21, 1933

1,898,629

UNITED STATES PATENT OFFICE

CHARLES HOLLERITH, OF JACKSON, MICHIGAN, ASSIGNOR TO AUTOMOTIVE FAN & BEARING CO., A CORPORATION OF MICHIGAN

MEANS FOR POSITIONING FAN BLADES WITH ACCURATE BALANCE

Application filed June 27, 1931. Serial No. 547,254.

This invention relates to cooling fans for automotive engines.

Cooling fans for automotive engines rotate at relatively high speeds and for this reason must be accurately balanced. It has heretofore been the practice to attach fan blades to spiders in balanced relation and then to secure the spider to the rotating part by means of a plurality of set screws spaced at a plurality of points at a given radius from the center of revolution.

No matter how carefully the holes are drilled and tapped for securing the spider to the rotating part it has been found impossible to produce an accurate balance in quantity production. The spider, except by mere accident in a few cases, will be located slightly off center. This unbalances the fan after assembly and the lack of balance excessively wears the bearings, produces an undesired strain on the fan blades and spider, makes the fan noisy and reduces its efficiency.

The manner in which I overcome these difficulties will now be described, reference being had to the drawing in which the single figure discloses a representative fan assembly.

Referring to the drawing, a pulley 1 has a hub with ends 2 and 3 and a central bore 4. The central bore is enlarged, as shown. In these enlargements are located bearing members of any kind. In the illustration are shown pulley bearings 5 and 6 which may be of standard construction. The outer part of the bore 4 is preferably slightly increased in diameter at 7 and 8 to aid in the ready insertion of the ball bearing member. In the enlarged bore 7 may be located a cup 9 containing a packing material 10 of wicking or any other fibrous material. A disk or washer 11 is adapted to close the open end of the cup 9 and in common with the cup fairly accurately fit the enlarged bore 7. A stationary shaft 12 adapted to be fastened in any form of bracket (not shown) has an enlarged or collar portion 13 fitting within holes through the cup 9 and washer 11. A portion 14 of the shaft is adapted to make an accurate fit with the inner raceway 15 of the ball bearings 5, 6. A nut 16, which may be of the castellated type with cotter pin 17, or any other type, holds the bearings in position on the shaft. A washer 18 may be used between this nut and the adjacent bearing member, as shown.

Beyond the outer bearing member, that is the one adjacent the fan blades, the central bore of the hub 8 may be slightly enlarged to aid in the removal and insertion of the bearing member.

The hub 3 preferably has a flange 19 which has a plurality of screw holes 20 for reception of the threaded portion of the screws 21 adapted to hold the fan spider 22 in place. The fan spider 22 has a plurality of holes 23 similarly positioned in respect to the holes 20. These holes 23 should be made of larger diameter than the shanks of the screws 21 which they are adapted to receive to permit of slight adjustment in locating the spider, as later described.

The fan spider 22 has an inner collar or washer 24 riveted, welded or otherwise attached to the spider, or this collar may be integral with the spider. This collar is accurately machined and attached to the spider in central position and it serves as a locating means in a die or jig while the fan blades 25, 26, are located with respect to opposite arms 27, 28, of the spider. There may be any number of these arms and fan blades. Usually the arms and blades will be arranged in diametrically opposed position for ease of balance.

The dies and jigs are designed so that the spider blade assembly will be normally in correct balance but it is advisable to test the assembly for balance before mounting in the bearing member. In making this test the washer 24 will be used to locate the assembly in the testing member. If it is slightly out of balance it is made to balance. The result is that the blades and spider are correctly balanced in respect to the circumference of the collar 24. The blade-spider assembly is then attached to the hub of the wheel by inserting the collar 24 inside of the bore in the hub, as shown. The bore of the hub and the collar 24 are so machined as to snugly fit together without play. The blade-spider assembly is thus accurately positioned in the hub of the wheel in relation to the center of rotation exactly the same way that the blade-spider assembly was put together in the jig and tested or balanced in the final balancing device. In other words, since the assembly was properly balanced on the collar it will be properly and accurately balanced about the center of rotation in the complete assembly.

By slightly enlarging the holes 23 the entire centering operation may be accomplished by means of the collar and the central bore of the hub. When the spider is placed in proper position against the flange 19 machine screws 21 are inserted in position and the blade-spider assembly is securely held in position. Appropriate lock washers or other securing devices may be used as indicated.

It has been found that the foregoing improvements result in accurately balanced fans with minimum amount of labor.

Having described my invention, what I claim is:

1. In fans, a rotatable pulley member having a central bore, a bearing and shaft assembly positioned centrally in said bore, a spider having a collar positioned centrally thereof and located in said bore, and fan blades attached to said spider and balanced in respect to the periphery of said collar.

2. In fans, a rotatable bearing member having a central bore, a bearing and shaft assembly positioned centrally in said bore, a spider having a collar positioned centrally thereof and located in said bore, fan blades attached to said spider and balanced in respect to the periphery of said collar, and screws extending loosely through holes in the spider and threaded in said bearing member.

In testimony whereof, I have signed my name to this specification this 24th day of June 1931.

CHARLES HOLLERITH.